M. U. BERNHEIM.
ROLLER BEARING.
APPLICATION FILED DEC. 23, 1912.
1,174,541.
Patented Mar. 7, 1916.
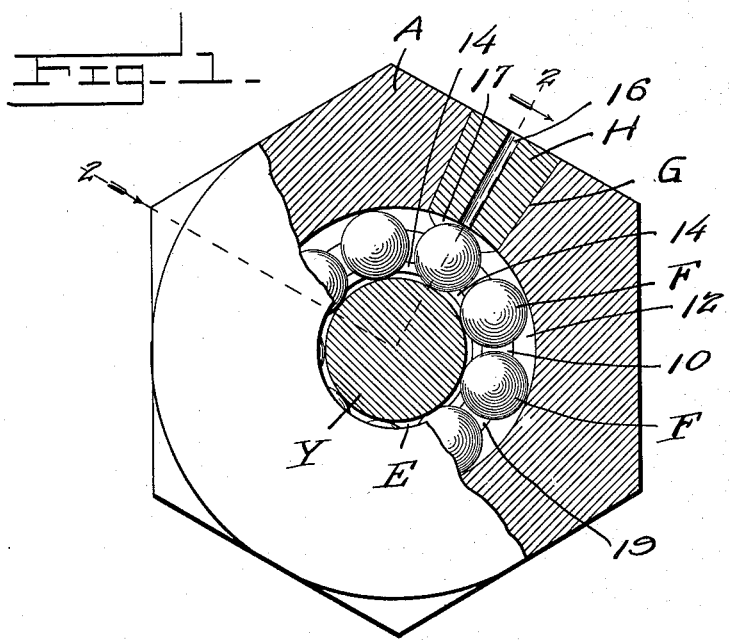
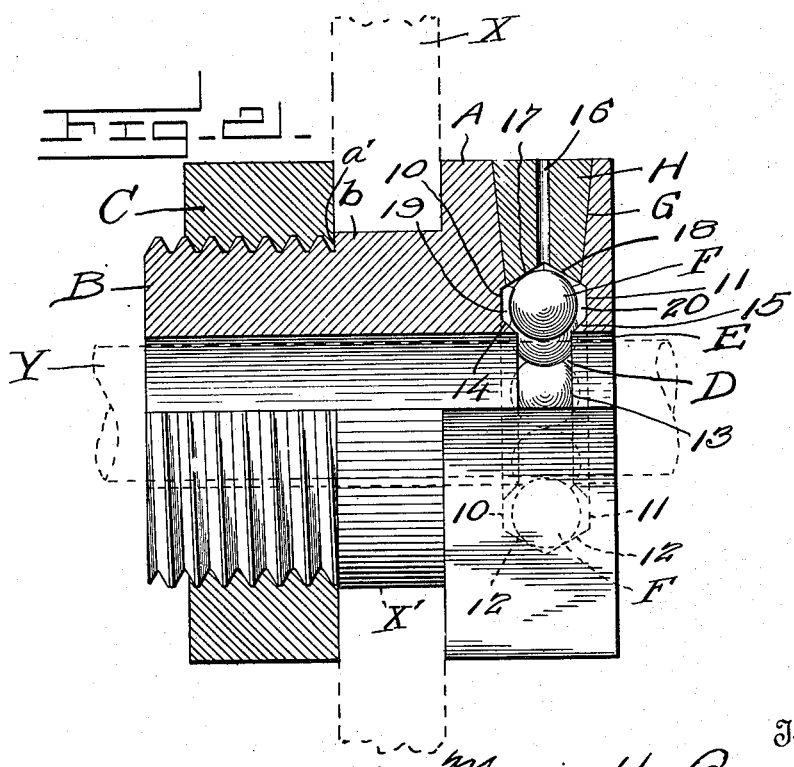
Witnesses
Inventor
Morris U. Bernheim
By C. J. Stockman
Attorney

UNITED STATES PATENT OFFICE.

MORRIS U. BERNHEIM, OF CINCINNATI, OHIO, ASSIGNOR TO THE ALVEY-FERGUSON COMPANY, OF OAKLEY, CINCINNATI, OHIO, A CORPORATION OF OHIO.

ROLLER-BEARING.

1,174,541.  Specification of Letters Patent.  Patented Mar. 7, 1916.

Application filed December 23, 1912. Serial No. 738,278.

*To all whom it may concern:*

Be it known that I, MORRIS U. BERNHEIM, a citizen of the United States, residing at Cincinnati, in the county of Hamilton and State of Ohio, have invented new and useful Improvements in Roller-Bearings, of which the following is a specification.

This invention relates to certain improvements in roller bearings and has particular reference to roller bearings designed for the special purpose of being used in gravity conveyers, elevators and other conveying machinery whose beds are composed in whole or in part of rollers, the bearings of the present case serving to sustain the rollers of said beds and permitting them to rotate with a minimum of friction, and being made so that they can be conveniently applied to the side members of the frames of such conveyers, elevators, etc. A few typical examples of the kind of conveying machinery for which the present bearing is specially adapted are shown in the Alvey Patents Number 714,432, dated November 25, 1902: Number 790,811, dated May 23, 1905: and Number 790,776, dated May 23, 1905.

In a concurrently-pending application filed by me October 31, 1908, and numbered, serially, 460,386, there is disclosed a roller bearing designed for the class of machinery to which the present invention relates, and there is illustrated therein a portion of a gravity conveyer having the bearings applied thereto. It will be understood that the present bearing forms a practical substitute for the bearing disclosed in the said application and in some cases may be preferred thereto, it being specially advantageous because of the simplicity of its construction and because it affords desirable provision for oiling of the balls and of the shaft which rotates in contact with said balls, while having many of the important advantages which are subserved by my earlier bearing hereinbefore referred to. As reference may be had to the said patents and to my said co-pending application for a fuller understanding as to the frames and rollers with which the present bearing is associated in practice, it is not considered to be necessary to illustrate or describe the same herein, in detail, the drawings of the present application, therefore, being confined to the bearing.

In said drawings:—Figure 1 is an enlarged view of the bearing, showing the same partly in end elevation and partly in section and Fig. 2 is a section on the line 2—2 of Fig. 1.

Similar characters of reference denote corresponding parts in both views.

The main or first member of the present bearing is hollow and comprises a head A and an externally-threaded stem B, which are preferably integral with each other. The stem B is made of such length that it will extend through the frame-member X, shown in dotted lines in Fig. 2, sufficiently to receive, upon its end opposite the head A, a second member which preferably is in the form of a clamping nut C. The head A bears against one side of the frame-member X and the clamping nut C bears against the other side of said frame-member, while the stem B extends through an aperture X' formed in said frame-member.

The head A is suitably formed with a chamber which extends circularly around the axial opening E which receives the shaft Y projecting outward from the end of the conveyer-roller (not shown) which is sustained by said bearing. This chamber D is formed with opposite side walls 10 and 11 and with an outer wall 12. Its inner wall is cut away at 13 and is formed with opposite beveled portions 14 and 15 which form converging lips at opposite sides of its cutaway portion 13. It forms a race for a series of balls F, or other suitable friction-reducing elements, which are freely rotatable therein. These friction-reducing elements may be seated on the lips 14 and 15, which permit their outer surfaces to protrude into the shaft opening E while preventing them from dropping into the shaft-opening when the shaft has not been inserted into the bearing.

The outer wall 12 of the chamber or ball race D is preferably oppositely beveled toward the side walls 10 and 11. The head A is also formed with an opening G which extends from its outer surface inwardly into the head and through the outer wall 12 of the chamber D. This opening G is intended to afford provision for the introduction of the balls, or other friction-reducing elements, F into the ball-race or chamber D, the friction-reducing elements reaching said ball-race or chamber and settling into place in the latter, by being dropped one after another through said opening. After the friction-reducing elements have been inserted the opening G is closed by a plug H, which has a longitudinal passageway 16 through which oil may be supplied to the chamber or race D. The inner end of this plug is concave, as shown in Fig. 1 and has diverging surfaces 17 and 18, as shown in Fig. 2, whereby it conforms in shape to that of the upper wall 12 of the chamber or race and forms, with said wall, a smooth and uninterrupted surface which touches each friction-reducing element at one or more separated points of very restricted area, as contradistinguished from being in contact with the friction-reducing elements throughout the entire area of the upper circumferential portions of the latter. Upon reference to Fig. 2 it will be noted that the distance between the side walls 10 and 11 of the chamber or race D is substantially greater than the diameter of the balls F whereby channels 19 and 20 are formed adapted to contain oil and to enable the balls to run in oil.

The plug H preferably is a tapered pin which may be driven into the opening G, the latter being correspondingly tapered, and held by tight frictional contact between the walls of the plug and opening: but it would not be a departure from the scope of the invention, considered in certain aspects, to thread the plug into the opening, or to provide the plug with a suitable oil-container, as an ordinary oil-cup, for example, which may, if desired be arranged outside the bearing and may be integral with the plug, or formed separate therefrom and suitably connected thereto, as by threads, whichever is preferred.

It will be understood that in practice there are two members X each of which is of suitable length and of a shape appropriate to that of the particular conveyer in which it is to be used. Each of these two members forms a side of the frame and each is provided at intervals with a line of apertures for the stems B of the bearings. The portions, $b$, of the stems which extend through the apertures X', are preferably smooth and of length substantially the same as the thickness of the frame-member X, and said portion preferably terminates in a shoulder $a'$ which is substantially in line with the inside surface of the member X.

The advantages of the herein-described bearing for the particular class of machinery for which it has been designed will be apparent, and it will be particularly noticed that it combines the utmost simplicity of construction with provision for the easy and quick assemblage of its parts and clamping to the frame of the machinery, and effective lubrication of the friction-reducing elements and shaft. The formation of the ball-race or chamber D within the head of the bearing and the utilization of said head as an element of the means by which the bearing is clamped to the frame, conduces to simplicity. The formation of a chamber or ball race of such size relative to the balls, or other friction-reducing elements employed, that the walls of the chamber will touch the friction-reducing elements at separated points of very restricted area reduces the friction between the friction-reducing elements and the race to a minimum and contributes to the formation of oil-containing spaces within said chamber or race, and the use of converging spaced lips at the mouth of the ball race contributes to the provision of a bearing which may be completely assembled before the shaft is inserted. The provision of a bearing of construction such that it may be quickly and effectively secured to the frame X is of considerable importance in the particular type of mechanism of which the present bearing forms a part, for it is customary in practice to ship the frame-members, rollers and other parts of these conveying mechanisms in a disassembled condition, the assembling being done at the place of use, under the supervision of an erector, by workmen picked up and who are frequently inexpert. As there are many bearings in each installation—the number frequently running up into the hundreds—and as each bearing must be properly located and its parts properly assembled, the importance of providing a very simple bearing and one which may be easily and quickly applied, at the factory if desired, without interference with the work which essentially is done at the place of use, becomes at once apparent.

Having now described the invention what I believe to be new and desire to secure by Letters Patent, is:—

1. A bearing for a conveyer roller, comprising a first member having a stem adapted to extend through an apertured support and an integral head at one end, and a second member adjustable longitudinally on said stem for clamping the support between said head and second member, said first member having an axial opening extending within the head, said head being provided with a chamber communicating with such opening and with means for retaining anti-friction devices in such chamber and permitting said devices to protrude into the communicating opening, anti-friction devices in such chamber, and said head being provided with an opening for permitting the introduction of said anti-friction device into such chamber.

2. A bearing for a conveyer roller, comprising a first member having a stem to extend through an apertured support and an integral head at one end, and a second member adjustable longitudinally on said stem for clamping the support between said head and second member, said first member having an axial opening extending within the head, said head being provided with a chamber communicating with such opening and with means for retaining anti-friction devices in such chamber and permitting said devices to protrude into the communicating opening, anti-friction devices in such chamber, said head being provided with a peripheral opening communicating with such chamber, and a plug removably mounted in such peripheral opening and provided with an aperture communicating with the chamber.

3. A bearing for a conveyer roller, comprising a first member and a second member, the first member having a stem to extend through an aperture in a support and being formed with an integral head at one end and the second member being adjustable longitudinally of the stem, the two members coöperating to clamp the support between the head and second member, the first member also having an axial opening which extends into the head, the head further having a chamber surrounding the opening and communicating with the latter, the walls of the chamber terminating in spaced relation and forming lips adjacent the opening, and the walls opposite the lips converging from opposite side walls of the chamber, anti-friction devices mounted in the chamber and engaging the converging walls of the latter and being free from the side walls and protruding from the chamber into the opening, the head further having an opening which extends outward from its periphery toward the chamber, and a plug removably mounted in the opening and having a conical recess in its inner end, the apical angle of the recess equaling the angle between the converging walls of the chamber.

4. A bearing for a conveyer roller, comprising a first member and a second member, the first member having a stem to extend through an aperture in a support and being formed with an integral head at one end and the second member being adjustable longitudinally of the stem, the two members coöperating to clamp the support between the head and second member, the first member also having an axial opening which extends into the head, the head further having a chamber surrounding the opening and communicating with the latter, the walls of the chamber terminating in spaced relation and forming lips adjacent the opening, and the walls opposite the lips converging from opposite side walls of the chamber, anti-friction devices mounted in the chamber and engaging the converging walls of the latter, and being free from the side walls and protruding from the chamber into the opening, the head further having an opening which extends outward through its periphery toward the chamber, and a plug removably mounted in the opening and having a conical recess in its inner end, the apical angle of the recess equaling the angle between the converging walls of the chamber, said plug having an oil opening extending longitudinally therethrough, the spaces between the anti-friction devices and side walls of the chamber constituting oil pockets or channels.

In testimony whereof I have hereunto set my hand in presence of two subscribing witnesses.

MORRIS U. BERNHEIM.

Witnesses:
E. A. GARTTMAN,
C. J. BUER.